US011235416B2

(12) United States Patent
Muehlleitner

(10) Patent No.: US 11,235,416 B2
(45) Date of Patent: Feb. 1, 2022

(54) WELDING ASSEMBLY FOR WELDING TWO RAILS OF A TRACK

(71) Applicant: Plasser & Theurer Export von Bahnbaumaschinen Gesellschaft m.b.H., Vienna (AT)

(72) Inventor: Heinz Muehlleitner, Neidling (AT)

(73) Assignee: Plasser & Theurer Export von Bahnbaumaschinen Gesellschaft m.b.H., Vienna (AT)

( * ) Notice: Subject to any disclaimer, the term of this patent is extended or adjusted under 35 U.S.C. 154(b) by 120 days.

(21) Appl. No.: 16/079,869

(22) PCT Filed: Mar. 6, 2017

(86) PCT No.: PCT/EP2017/000300
§ 371 (c)(1),
(2) Date: Aug. 24, 2018

(87) PCT Pub. No.: WO2017/167433
PCT Pub. Date: Oct. 5, 2017

(65) Prior Publication Data
US 2019/0054561 A1   Feb. 21, 2019

(30) Foreign Application Priority Data

Apr. 1, 2016 (AT) ................ GM 68/2016

(51) Int. Cl.
*B23K 11/04* (2006.01)
*B23K 37/04* (2006.01)
(Continued)

(52) U.S. Cl.
CPC ........ *B23K 11/046* (2013.01); *B23K 35/0255* (2013.01); *B23K 37/003* (2013.01);
(Continued)

(58) Field of Classification Search
CPC .............. B23K 11/046; B23K 2101/26; B23K 35/0255; B23K 37/003; B23K 37/0435; E01B 29/42
(Continued)

(56) References Cited

U.S. PATENT DOCUMENTS 2,126,903 A * 8/1938 Martin ................... B23K 11/28
219/89
2,761,952 A * 9/1956 Totten ................ B23K 11/0935
219/101
(Continued)

FOREIGN PATENT DOCUMENTS

AU 2008302791 B2 2/2014
CN 1090528 A 8/1994
(Continued)

OTHER PUBLICATIONS

Chinese Office Action in Chinese Application No. 201780020381.1, dated Jan. 15, 2020 with English translation.
(Continued)

*Primary Examiner* — Helena Kosanovic
*Assistant Examiner* — Ket D Dang
(74) *Attorney, Agent, or Firm* — Collard & Roe, P.C.

(57) ABSTRACT

A welding assembly (1) for welding two rails (2) of a track includes two rail clamping units (5) movable towards one another in an assembly longitudinal direction (4). A power rail (10) provided for power transmission is configured as an assembly guide (3), extending in an assembly longitudinal direction (4), which is spaced from displacement drives (11) and connects both rail clamping units (5) to one another. The power rail (10) is equipped with a cooling device and displaceable in the assembly longitudinal direction (4) relative to the rail clamping unit (5) equipped with the power rail contacts (8).

3 Claims, 2 Drawing Sheets

Figure 1:
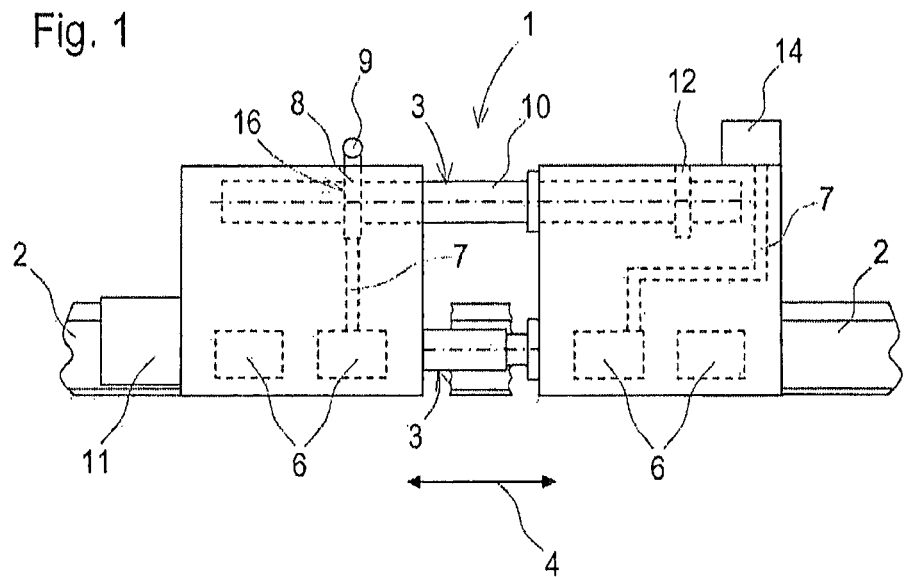

(51) Int. Cl.
*E01B 29/42* (2006.01)
*B23K 35/02* (2006.01)
*B23K 37/00* (2006.01)
*B23K 101/26* (2006.01)

(52) U.S. Cl.
CPC .......... *B23K 37/0435* (2013.01); *E01B 29/42* (2013.01); *B23K 2101/26* (2018.08)

(58) Field of Classification Search
USPC ............... 219/101, 53–55, 97–99, 108–110; 83/620, 861, 914; 414/444, 457; 29/281.5
See application file for complete search history.

(56) References Cited

U.S. PATENT DOCUMENTS

| | | | |
|---|---|---|---|
| 2,967,925 A * | 1/1961 | Rietsch | B23K 11/046 219/57 |
| 3,349,216 A | 10/1967 | Paton et al. | |
| 3,978,746 A | 9/1976 | Kuchuk-Yatsenko et al. | |
| 4,762,263 A | 8/1988 | Oishibashi et al. | |
| 5,099,097 A * | 3/1992 | Theurer | E01B 29/46 219/53 |
| 5,389,760 A | 2/1995 | Zollinger | |
| 5,979,738 A * | 11/1999 | Kuchuk-Yatsenko | B23K 11/046 228/5.7 |
| 8,907,242 B2 * | 12/2014 | Kuchuk-Yatsenko | B23K 11/046 219/55 |
| 2003/0141283 A1 | 7/2003 | Theurer et al. | |
| 2010/0155372 A1 * | 6/2010 | Battisti | B23K 11/046 219/55 |
| 2011/0290766 A1 * | 12/2011 | Battisti | B23K 11/043 219/108 |
| 2012/0025436 A1 | 2/2012 | Theurer et al. | |
| 2013/0008874 A1 | 1/2013 | Kuchuk-Yatsenko et al. | |
| 2016/0039038 A1 | 2/2016 | Vaia | |
| 2016/0199925 A1 | 7/2016 | Fletzer | |

FOREIGN PATENT DOCUMENTS

| | | |
|---|---|---|
| CN | 1435535 A | 8/2003 |
| CN | 102239295 A | 11/2011 |
| CN | 102395444 A | 3/2012 |
| CN | 202336659 U | 7/2012 |
| CN | 102861978 A | 1/2013 |
| CN | 105452566 A | 3/2016 |
| EP | 0 597 215 A1 | 5/1994 |
| JP | S51-144352 A | 12/1976 |
| JP | S63-101086 A | 5/1988 |
| RU | 2 366 550 C1 | 9/2009 |
| WO | 2004/111340 A1 | 12/2004 |

OTHER PUBLICATIONS

International Search Report of PCT/EP2017/000300, dated Jun. 7, 2017.

* cited by examiner

WELDING ASSEMBLY FOR WELDING TWO RAILS OF A TRACK

CROSS REFERENCE TO RELATED APPLICATIONS

This application is the National Stage of PCT/EP2017/000300 filed on Mar. 6, 2017, which claims priority under 35 U.S.C. § 119 of Austrian Application No. GM 68/2016 filed on Apr. 1, 2016, the disclosures of which are incorporated by reference. The international application under PCT article 21(2) was not published in English.

The invention relates to a welding assembly for welding two rails of a track, including two rail clamping units movable towards one another in an assembly longitudinal direction along assembly guides, each rail clamping unit having clamping jaws designed to be applied to the rail in pairs by means of a drive, wherein the clamping jaws provided for power transmission are connected—with regard to one of the two rail clamping units—by a power line to a power rail contact which is designed to be applied to a power rail by means of a fixing drive and is displaceable relative thereto.

A welding assembly of this type for flash-butt welding is known from U.S. Pat. No. 8,907,242. Two power rails separated from one another as well as two power rail contacts are provided for power transmission. The power rail simultaneously also functions as a hydraulic cylinder for displacement of the rail clamping units.

It is the object of the present invention to provide a welding assembly of the type mentioned at the beginning with which an improved power transmission is possible.

According to the invention, this object is achieved with a welding assembly of the specified kind by way of the features cited in the characterizing part of the main claim.

By using merely a single power rail, a reduction of the structural expense can be achieved. In addition, the power rail—used, parallel to the power transmission, only as a guide for the two rail clamping units—can be optimized with regard to both current conductivity as well as cooling.

Further advantages of the invention become apparent from the dependent claims and the drawing description.

Figure 2:
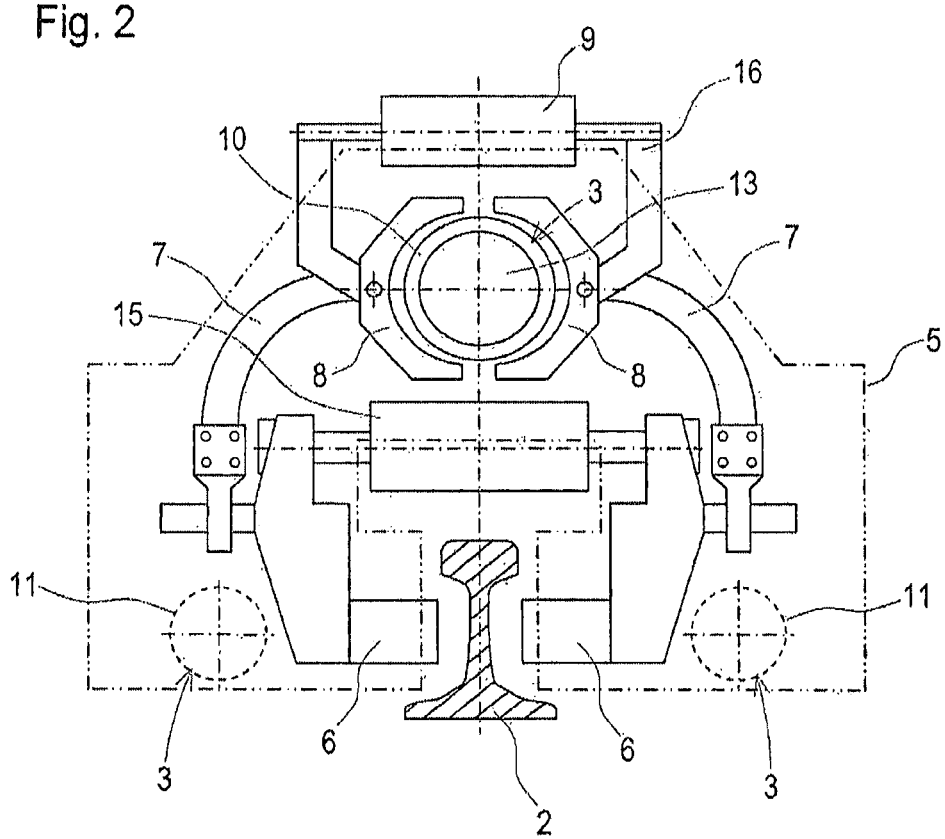

The invention will be described in more detail below by way of an example of embodiment shown in the drawing. There is shown in:

FIG. 1 a simplified side view of a welding assembly,

FIG. 2 a schematic view of clamping jaws for power transmission, and

Figure 3:
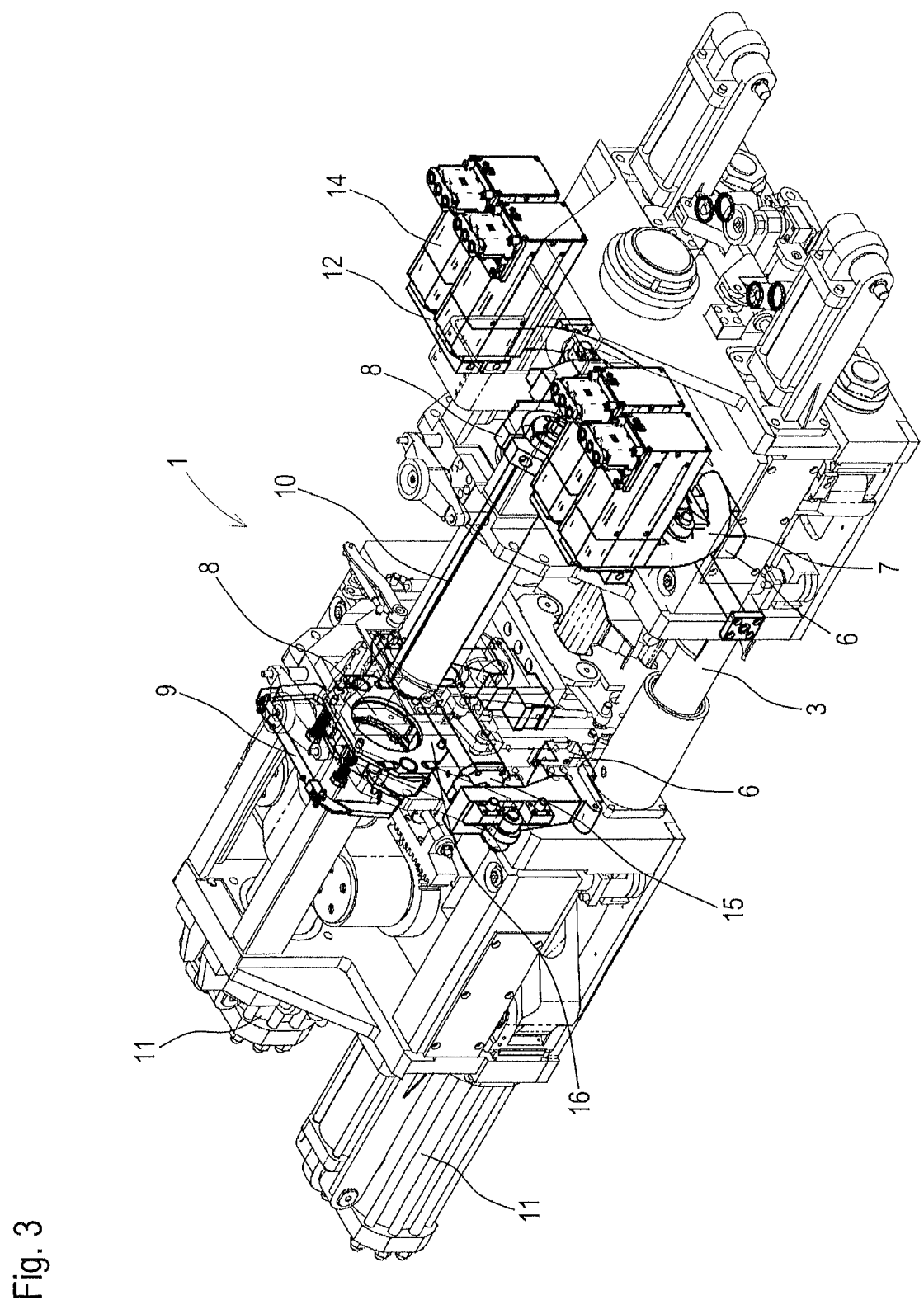

FIG. 3 an overall view of the welding assembly, wherein the parts provided for power transmission are shown in solid lines.

A welding assembly shown in FIGS. 1 to 3 is designed for welding two rails 2 of a track and has rail clamping units 5 movable towards one another in an assembly longitudinal direction 4 along three assembly guides 3. Each rail clamping unit 5 is equipped with clamping jaws 6 designed to be applied to the rail 2 in pairs. As can be seen in particular in FIG. 2, the two lower assembly guides 3 positioned at either side of the rails 2 are configured as hydraulic displacement drives 11 designed for adjusting the two rail clamping units 5 to one another.

The clamping jaws 6 provided for power transmission are separate from the clamping jaws 6 provided for clamping the rails (see FIG. 1) and are connected in each case—with regard to one of the two rail clamping units 5—by a power line 7 to a power rail contact 8. These can be applied by means of a fixing drive 9 to a power rail 10 of tubular cross-section.

In the region between the power rail contacts 8 and a power supply 12, the power rail 10 is identical with the assembly guide 3 which extends in the assembly longitudinal direction 4, is spaced from the two displacement drives 11 and connects both rail clamping units 5 to one another. In this section, the assembly guide 3 or power rail 10 has an enlarged cross-section of copper as well as a cooling device 13 (see FIG. 3).

The power rail 10 or assembly guide 3 is connected only to the rail clamping unit 5 which has transformers 14 for the power supply 12, and is thus displaceable in the assembly longitudinal direction 4 relative to the rail clamping unit 5 equipped with the power rail contacts 10.

As visible in FIG. 2, the two clamping jaws 6 provided for the power feed are adjustable perpendicularly to the assembly longitudinal direction 4 by way of a separate clamping drive 15 in order to contact the rail 2. The two power rail contacts 8 of semi-circular design are arranged on a common contact carriage 16 and can be applied to the power rail 10 by means of the common fixing drive 9. The contact carriage 16 is mounted for displacement in the assembly longitudinal direction 4 relative to the associated rail clamping unit 5.

To initiate a welding operation, the rail 2 which is not displaced relative to the sleepers (at the right side in FIG. 1) is clamped fast with the aid of the clamping jaws 6 by the first rail clamping unit 5 equipped with the transformers 14. With the aid of the oppositely positioned second rail clamping unit 5, the second rail 2—with pressing-on of the associated clamping jaws 6 not provided for power transmission, and with actuation of the displacement drives 11—is pulled in the direction of the oppositely positioned first rail 2 until a rail gap of about 30 to 35 mm is attained which is required for initiating the welding operation.

As the next step, the clamping jaws 6 provided for power transmission are pressed to the above-mentioned second rail 2, and the two power rail contacts 8 are pressed to the power rail 10. In further sequence, the said second rail clamping unit 5 is moved, together with the clamped second rail 2, further towards the first rail 2. At the same time, a permanent power supply takes place via the transformers 14, the power rail 10, the power rail contacts 8, the power line 7 and the connected clamping jaws 6.

Due to the resulting relative displacement between the power rail 10 and the clamped-fast power rail contacts 8 with regard to the second rail clamping unit 5, a slight bending of the two flexible power lines 7 occurs in the process. After termination of the welding operation, the two power rail contacts 8 are again spaced from the power rail 10 (see FIG. 2), wherein the contact carriage 16 is automatically displaced back into its front starting position by way of spring pre-tensioning.

The invention claimed is:

1. A welding assembly for welding two rails of a track, comprising:
   two rail clamping units;
   a plurality of displacement drives, wherein said two rail clamping units are movable towards one another in the assembly in a longitudinal direction by means of said displacement drives,
   a drive,
   a power line;
   a power rail configured to transport electrical energy;
   a power supply;

a plurality of clamping jaws, wherein each rail clamping unit has clamping jaws designed to be applied to a corresponding rail in pairs by means of said drive, wherein the clamping jaws provided for power transmission are connected—with regard to one of the two rail clamping units—by said power line to power rail contacts which are designed to be applied to said power rail by means of a fixing drive and is displaceable relative thereto, comprising the following features:
- a) the power rail is configured as an assembly guide, extending in the assembly longitudinal direction, which is spaced from the displacement drives and connects said two rail clamping units to one another,
- b) the power rail is displaceable in the assembly longitudinal direction relative to at least one rail clamping unit of said two rail clamping units which is equipped with the power conductor rail contacts;

the power rail is powered by the power supply, wherein the power supply is coupled to the power rail;

wherein two of the power rail contacts are arranged on a common contact carriage and designed to be applied to the power rail by means of the xxx fixing drive.

2. The welding assembly according to claim 1, wherein the clamping jaws provided for power transmission are separate from the clamping jaws provided for rail clamping and for contacting a rail are adjustable perpendicularly to the assembly longitudinal direction by means of a separate clamping drive.

3. The welding assembly as in claim 1, further comprising at least one transformer coupled to said power supply.

\* \* \* \* \*